(12) United States Patent
Lee et al.

(10) Patent No.: US 10,075,220 B2
(45) Date of Patent: Sep. 11, 2018

(54) APPARATUS AND METHOD FOR FEEDING BACK CHANNEL INFORMATION IN WIRELESS COMMUNICATION SYSTEM

(71) Applicants: Samsung Electronics Co., Ltd., Gyeonggi-do (KR); Seoul National University R&DB Foundation, Seoul (KR)

(72) Inventors: Keonkook Lee, Gyeonggi-do (KR); Lua Ngo, Seoul (KR); Byonghyo Shim, Seoul (KR); Byungju Lee, Seoul (KR); Taeyoung Kim, Seoul (KR); Jiyun Seol, Gyeonggi-do (KR)

(73) Assignees: SAMSUNG ELECTRONICS CO., LTD., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 15/089,397

(22) Filed: Apr. 1, 2016

(65) Prior Publication Data

US 2016/0294457 A1  Oct. 6, 2016

(30) Foreign Application Priority Data

Apr. 1, 2015 (KR) ........................ 10-2015-0046387

(51) Int. Cl.
*H04K 1/10* (2006.01)
*H04L 27/28* (2006.01)
*H04B 7/0456* (2017.01)
*H04B 7/06* (2006.01)
*H04B 7/0452* (2017.01)

(52) U.S. Cl.
CPC .......... *H04B 7/0478* (2013.01); *H04B 7/065* (2013.01); *H04B 7/0663* (2013.01); *H04B 7/0452* (2013.01)

(58) Field of Classification Search
CPC .... H04B 7/0478; H04B 7/0621; H04B 7/065; H04B 7/0663; H04B 7/0452
USPC .................... 375/219, 260, 224, 220; 455/69
See application file for complete search history.

(56) References Cited

U.S. PATENT DOCUMENTS

2003/0206686 A1* 11/2003 Pau ....................... G02B 6/3588
                                                           385/18
2005/0281321 A1* 12/2005 Bergstrom ........... H04B 1/7102
                                                           375/144

(Continued)

*Primary Examiner* — Wednel Cadeau

(57) ABSTRACT

The present disclosure relates to a pre-$5^{th}$-generation (5G) or 5G communication system to be provided for supporting higher data rates beyond $4^{th}$-generation (4G) communication system such as long term evolution (LTE). The present disclosure relates to channel information feedback in a wireless communication system, and an operation method of a receiving node includes: determining compressed channel information based on an eigenvalue decomposition of a covariance matrix regarding a channel, and transmitting, to a transmitting node, a direction index and a magnitude index representing the compressed channel information. Herein, a dimension of the compressed channel information is lower than a dimension of channel information associated with the transmitting node. Also, the disclosure includes other embodiments, different from the above described embodiment.

15 Claims, 16 Drawing Sheets

(56) References Cited

U.S. PATENT DOCUMENTS

| | | | |
|---|---|---|---|
| 2010/0238984 A1* | 9/2010 | Sayana | H04B 7/0634 375/219 |
| 2011/0164696 A1* | 7/2011 | Choi | H04L 25/0204 375/260 |
| 2013/0308714 A1 | 11/2013 | Xu et al. | |

* cited by examiner

APPARATUS AND METHOD FOR FEEDING BACK CHANNEL INFORMATION IN WIRELESS COMMUNICATION SYSTEM

CROSS-REFERENCE TO RELATED APPLICATION AND CLAIM OF PRIORITY

The present application is related to and claims benefit under 35 U.S.C. § 119(a) to Korean Application Serial No. 10-2015-0046387, which was filed in the Korean Intellectual Property Office on Apr. 1, 2015, the entire content of which is hereby incorporated by reference.

TECHNICAL FIELD

The present disclosure relates to the transmission of channel information in a wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The full-dimension (FD)-multi-input multi-output (MIMO) system is also referred to as a high-capacity MIMO system. The high-capacity MIMO communication system mostly assumes a time division duplexing (TDD) system out of a frequency division duplexing (FDD) scheme and the TDD scheme, and utilizes the channel reciprocity of an uplink and a downlink, so as to avoid the issue associated with a channel feedback. However, the FDD scheme is still broadly utilized in many cellular networks, and actually, applying the high-capacity MIMO technology to the FDD system is an important issue, from the perspective of backward compatibility. To perform beamforming in a transmitting node of the FDD system, channel state information is required. However, it is difficult to use the uplink resources only for the purpose of feedback of the channel state information, and thus, the channel feedback is generally expressed as a limited number of feedback bits. When the feedback information is incomplete information, the beamforming of the transmitting node is also incorrect. Actually, in the case of multi-user (MU)-MIMO system, due to the incorrect beamforming, inter-user interference may be incompletely removed and thus, a signal-to-interference-and-noise ratio (SINR) of a receiving node may deteriorate. It is an interference-limited system under the limited feedback, and thus, the accuracy of the channel state information may directly affect a multiplexing gain of a MU-MIMO downlink. Particularly, to maintain the difference with the sum rate of complete channel state information within a predetermined range, the number of bits for quantizing a channel needs to be set to be proportional to the number of base station's antennas and a signal-to-noise ratio (SNR). In addition, the FD-MIMO system is a technology in which a base station obtains a high transmission rate by utilizing a large number of (tens to hundreds of) antennas, and the feedback load that simply increases in proportion to the number of antennas may continuously increase.

SUMMARY

To address the above-discussed deficiencies, it is a primary object to provide a method and apparatus for feeding back channel information in a wireless communication system.

Another embodiment of the present disclosure provides a method and apparatus for increasing the accuracy of the feedback of channel information in a wireless communication system.

Another embodiment of the present disclosure provides a method and apparatus for compressing feedback data that includes channel information in a wireless communication system.

Another embodiment of the present disclosure provides a method and apparatus for reducing the number of dimensions for quantization of channel information in a wireless communication system.

Another embodiment of the present disclosure provides a method and apparatus for expressing channel information in magnitude and direction in a wireless communication system.

Another embodiment of the present disclosure provides a method and apparatus for representing channel information based on a magnitude index and a direction index in a wireless communication system.

Another embodiment of the present disclosure provides a method and apparatus for compressing channel information based on channel-related information in a wireless communication system.

Another embodiment of the present disclosure provides a method and apparatus for reducing an amount of data of channel information, based on an eigenvalue decomposition in a wireless communication system.

Another embodiment of the present disclosure provides a method and apparatus for compressing channel information based on an eigenvalue of a covariance matrix of a channel in a wireless communication system.

According to an embodiment of the present disclosure, there is provided an operation method of a receiving node in a wireless communication system, the method including: determining compressed channel information based on an eigenvalue decomposition of a covariance matrix regarding a channel; and transmitting, to a transmitting node, a direction index and a magnitude index representing the compressed channel information. Herein, a dimension of the compressed channel information is lower than a dimension of channel information associated with the transmitting node.

According to an embodiment of the present disclosure, there is provided and an operation method of a transmitting node in a wireless communication system, the method including: receiving a direction index and a magnitude index from a receiving node; and determining channel information associated with the receiving node, from the direction index and the magnitude index, based on an eigenvalue decomposition of a covariance matrix regarding a channel.

According to an embodiment of the present disclosure, there is provided a receiving node apparatus in a wireless communication system, the apparatus including: a controller to determine compressed channel information based on an eigenvalue decomposition of a covariance matrix regarding a channel; and a transmitting unit to transmit, to a transmitting node, a direction index and a magnitude index representing the compressed channel information. Herein, a dimension of the compressed channel information is lower than a dimension of channel information associated with the transmitting node.

According to an embodiment of the present disclosure, there is provided a transmitting node apparatus in a wireless communication system, the apparatus including: a receiving unit to receive a direction index and a magnitude index from a receiving node; and a controller to determine channel information associated with the receiving node, from the direction index and the magnitude index, based on an eigenvalue decomposition of a covariance matrix regarding a channel.

By compressing and quantizing a channel based on a feature of a temporal correlation of the channel in a wireless communication system, the accuracy of feedback may be improved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
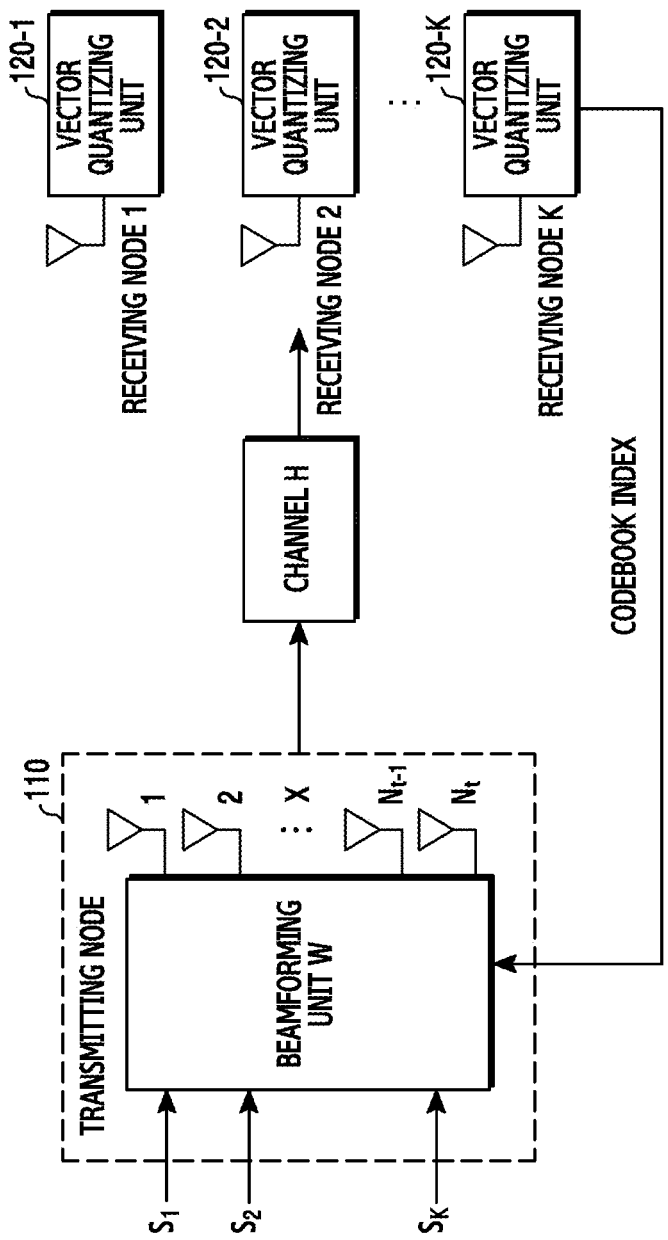
FIG. 1 illustrates a feedback of quantized channel information in a wireless communication system according to various embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. Hereinafter, the operational principle of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms which will be described below are terms defined in consideration of the functions in the present disclosure, and may be different according to users, intentions of the users, or customs. Therefore, the definition should be made based on the overall contents of the present specification.

The disclosure provided below will describe a technology for feeding back channel information in a wireless communication system. Particularly, the present disclosure describes a technology for performing an efficient channel information feedback by reducing the magnitude of channel information in the wireless communication system.

The terminologies indicating signals, terminologies indicating the components of a channel, terminologies indicating the elements of channel information, terminologies indicating a mathematical operation process with respect to channel information, terminologies indicating apparatuses, terminologies indicating codes, and the like, which are used in the description provided below, are exemplified for ease of description. Therefore, the present disclosure may not be limited by the terminologies provided below, and other terms that indicate subjects having equivalent technical meanings may be used.

The performance of a limited-channel feedback may be dependent upon the accuracy of channel vector quantization. When beamforming is performed using an incorrect quantized-channel vector, the system may be an interference-limited system where inter-user interference is incompletely removed, and thus, it is difficult to expect the increase in a sum rate. Particularly, when feedback is performed in a next-generation MIMO communication system, the dimension of a channel vector needs to linearly increase as the number of transmission antennas increases. Therefore, the amount of feedback for channel vector quantization cannot but increase as the number of antennas of a transmitting node increases. However, it is difficult to use the uplink resources only for the purpose of feeding back the channel state information. Therefore, generally, the channel feedback needs to be expressed by a small number of bits, and the accuracy of channel vector quantization decreases. Accordingly, it is difficult to obtain the increase in the performance through beamforming.

Various embodiments of the present disclosure are provided to reduce a dimension of a vector for channel quantization, by utilizing the compression of a feedback through eigenvalue decomposition in a feedback process, and to reduce the system feedback load.

FIG. 1 is a diagram illustrating a feedback of quantized channel information in a wireless communication system according to the present disclosure. FIG. 1 illustrates channel information feedback between a transmitting node 110 and a plurality of receiving nodes 120-1 to 120-K.

Referring to FIG. 1, the transmitting node 110 has Nt antennas, and each of the receiving nodes 120-1 to 120-K has a single antenna. Each of the receiving nodes 120-1 to 120-K may perform channel vector quantization for selecting a codebook index that maximizes the channel quality (e.g., signal-to-interference-and noise ratio (SINR)). Generally, a signal received in a fading channel may be expressed in Equation 1 as provided below.

$$y_{k,\ell}[n] = h_{k,\ell}^H w_{k,\ell} s_{k,\ell}[n] + h_{k,\ell}^H \sum_{j \neq k} w_{j,\ell} s_{j,\ell}[n] + z_{k,\ell}[n]$$ [Equation 1]

In Equation 1, $y_{k,l}[n]$ denotes a signal that is received by a $k^{th}$ receiving node 120-$k$ through an $n^{th}$ channel of a first block. $h_{k,l} \in c^{N_t}$ denotes a channel vector from the $k^{th}$ receiving node 120-$k$ to an antenna array of the transmitting node 110. $w_{i,l} \in C^{N_t}$ denotes a beamforming vector $\|w_{i,l}\|^2=1$ of an $i^{th}$ receiving node 120-$i$. $s_{i,l}[n] \in C$ denotes a data symbol that is received by the $i^{th}$ receiving node 120-$i$. $z_{k,l}[n] \sim CN(0,1)$ denotes a normalized Gaussian noise that is received by the $k^{th}$ receiving node 120-$k$. When the channels have a spatial correlation and a temporal correlation of the antenna array of the transmitting node 110, a channel vector may comply with a Gauss-Markov distribution, such as Equation 2 as provided below.

$$h_{k,0} = T_{t,k}^{1/2} g_{k,0}$$

$$h_{k,l} = \eta h_{k,l-1} + \sqrt{1-\eta^2} R_{t,k}^{1/2} g_{k,l}, l \geq 1$$ [Equation 2]

In Equation 2, $h_{k,l}$ denotes a channel vector associated with the $k^{th}$ receiving node 120-$k$. $R_{t,k} \in C^{N_t \times N_t}$ denotes a covariance matrix associated with a channel between the $k^{th}$ receiving node 120-$k$ and the transmitting node 110. $g_{k,l} \in C_{N_t}$ denotes a $k^{th}$ block fading information vector ($g_{k,l} \sim CN(0, I_{N_t})$). $\eta$ denotes a temporal correlation coefficient ($0 \leq \eta < 1$).

Beamforming is performed for each block, and thus, a block index l will be omitted in equations that are provided for the purpose of description. A vector matrix equation may be expressed in Equation 3 as provided below.

$$y[n] = Hx[n] + z[n]$$ [Equation 3]

In Equation 3 $[h_1 h_2 \ldots h_k]^H \in C^{K \times N_t}$ denotes a composite channel matrix. $z[n] = [z_1[n] z_2[n] \ldots z_K[n]]^T \in C^K$ denotes a complex Gaussian noise vector ($z[n] \sim CN(0, I_K)$). $x[n]$ denotes a transmission signal vector having a normalized constrained-power of $E[\|x[n]\|^2] = P$, $y[n] = [y_1[n] y_2[n] \ldots y_K[n]]^T$ denotes a vectorized reception signal vector. To control the interference between receiving nodes 120, beamforming may be applied as given in Equation 4.

$$x[n] = Ws[n]$$ [Equation 4]

In Equation 4, $x[n]$ denotes a transmission symbol vector, $W = [w_1 w_2 \ldots w_K]^H \in C^{N_t \times K}$ denotes a beamforming matrix, and $s[n] = [s_1[n] s_2[n] \ldots s_K[n]]^T \in C^K$ denotes a data symbol vector. When the interference $$h_k^H \sum_{j \neq k} w_j s_j[n]$$

between receiving nodes 120 is regarded as noise, the sum rate of the receiving nodes 120 may be expressed in Equation 5 as provided below.

$$R_{sum} = \sum_{k=1}^{K} \log_2 \left( 1 + \frac{\frac{P}{K} |h_k^H w_k|^2}{1 + \frac{P}{K} \sum_{j=1, j \neq k} |h_k^H w_j|^2} \right)$$ [Equation 5]

In Equation 5, $R_{sum}$ denotes a sum rate, $h_k$ denotes a channel vector, and $w_k$ denotes a beamforming vector.

In a limited channel feedback system, all of the receiving nodes 120-1 to 120-K may quantize channel direction information $$\bar{h}_k = \frac{h_k}{\|h_k\|}.$$

The receiving nodes 120-1 to 120-K may select a codebook index that maximizes a channel quality, based on a codebook $C = \{c_1, \ldots, c_{2^B}\}$ having a predetermined number of feedback bits (i.e., B feedback bits). The codebook index may be selected as shown in Equation 6.

$$\hat{h}_k = \underset{c \in C}{\mathrm{argmax}} |\bar{h}_k^H c|$$ [Equation 6]

In Equation 6, $\hat{h}_k$ denotes a codebook index, c denotes a codeword in a codebook, c denotes a codebook, and $\bar{h}_k$ denotes normalized channel information.

Accordingly, the transmitting node 110 receives a codebook index from the receiving nodes 120-1 to 120-K, and forms a composite channel matrix. The composite channel matrix may be formed as shown in Equation 7.

$$\hat{H}=[\hat{h}_1,\hat{h}_2,\ldots,\hat{h}_K] \quad \text{[Equation 7]}$$

In Equation 7, $\hat{H}$ denotes a composite channel matrix, and $\hat{h}_k$ denotes a channel vector with respect to the $k^{th}$ receiving node 120-k.

By using the composite channel matrix, the transmitting node 110 may determine a beamforming matrix. For example, a zero-forcing beamforming matrix may be used, and the zero-forcing beamforming matrix may be expressed in Equation 8 as provided below.

$$\hat{W}_{zf}=\hat{H}(\hat{H}^H\hat{H})^{-1} \quad \text{[Equation 8]}$$

In Equation 8, $\hat{W}_{zf}$ denotes a beamforming matrix, $\hat{H}$ and denotes a composite channel matrix.

Generally, to satisfy a transmission signal power constraint, the beamforming vector of the $k^{th}$ receiving node 120-k may be determined by normalizing a $k^{th}$ column vector of the matrix $\hat{W}_{zf}$. The normalized $k^{th}$ column vector may be expressed in Equation 9 as provided below.

$$\hat{w}_k = \frac{\hat{W}_{zf}^k}{\|\hat{W}_{zf}^k\|} \quad \text{[Equation 9]}$$

In Equation 9, $\hat{w}_k$ denotes a normalized $k^{th}$ column vector, and $\hat{W}_{zf}^k$ denotes a $k^{th}$ column vector of $\hat{W}_{zf}$.

Although the performance of a downlink may be improved through feedback of a channel state or channel information and appropriate beamforming of the transmitting node 110 based on the same, the decrease in uplink resources may be inevitable. Therefore, the amount of channel state information that is fed back may be limited. Particularly, in the case of MU-MIMO system, due to the incorrect beamforming, inter-user interference may be incompletely removed. In this instance, the MU-MIMO system may be more affected by the limited number of feedback bits than a single-user (SU) MIMO system. In the case of the SU-MIMO system, the accuracy of the channel state information may affect the performance but may not change a multiplexing gain. Conversely, under the condition of a limited feedback, the performance of the MU-MIMO system may not be improved any longer due to the interference. Therefore, the accuracy of the channel state information may directly affect the multiplexing gain of a MU-MIMO downlink. To obtain a sum rate that is similar to the complete channel state information, the amount of feedback for quantizing a channel may need to be set to be proportional to the number of antennas of the transmitting node 110 and a signal-to-noise ratio (SNR). The number of feedback bits required to use a random vector quantizing scheme may be expressed in Equation 10 as provided below.

$$B = \frac{N_t-1}{3}P_{dB} \quad \text{[Equation 10]}$$

In Equation 10, B denotes the number of feedback bits, $N_t$ denotes the number of antennas of a transmitting node, and $P_{dB}$ denotes a sum transmission power of a dB scale.

In the case of the high-capacity MIMO system, the transmitting node 110 utilizes a large number of antennas and thus, simple enlargement of the number of feedback bits may not be an effective solution. Therefore, there is a desire for a method that is capable of reducing a feedback load by minimizing the performance deterioration.

Figure 2:
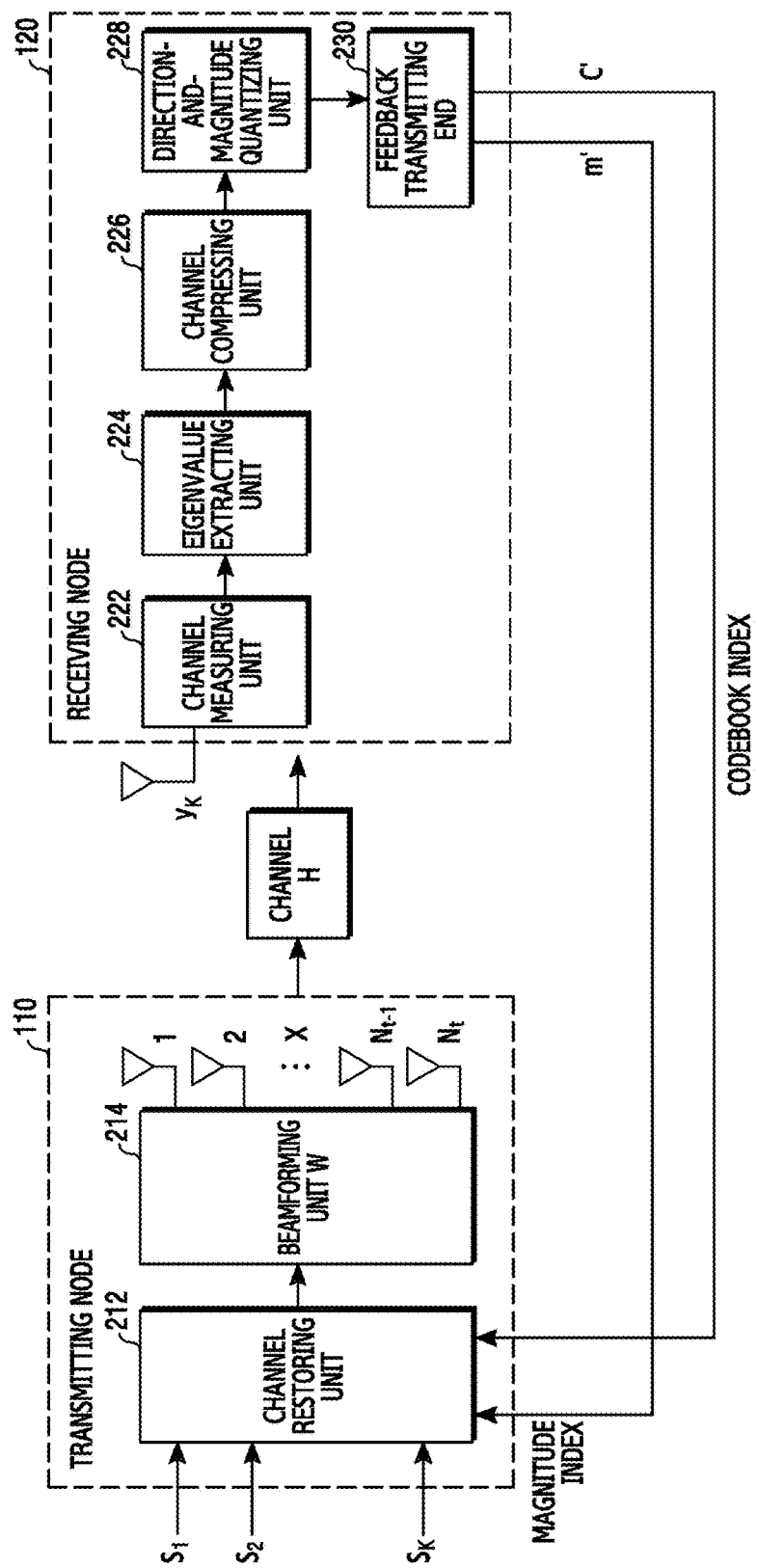
FIG. 2 illustrates a feedback of compressed channel information in a wireless communication system according to various embodiments of the present disclosure.

FIG. 2 is a diagram illustrating a feedback of compressed channel information in a wireless communication system according to the present disclosure. FIG. 2 illustrates a compressed channel information feedback between the transmitting node 110 and the receiving node 120. FIG. 2 illustrates a functional block diagram of the transmitting node 110 and the receiving node 120.

Referring to FIG. 2, the receiving node 120 may include: a channel measuring unit 222 that generates channel information by measuring a channel using a signal that passes through a channel; an eigenvalue extracting unit 224 that extracts, from the channel information, eigenvalues corresponding to a channel between the receiving node 120 and the transmitting node 110; a channel compressing unit 226 that compresses channel information based on the eigenvalues; a direction-and-magnitude quantizing unit 228 that quantizes compressed channel information; and a feedback transmitting unit 230 that processes quantized compressed-channel information into feedback information, and transmits the feedback information to the transmitting node 110. The transmitting node 110 may include: a channel restoring unit 212 that restores channel information from feedback information received from the receiving node 120, that is, compressed and quantized channel information; and a beamforming unit 214 that performs beamforming based on the channel information.

In comparison with a general feedback procedure, the channel information feedback according to the present disclosure illustrated in FIG. 2, may have a difference as follows: First: a configuration that performs eigenvalue decomposition with respect to long-term channel covariance information; Second: a configuration that compresses a channel by utilizing a decomposed eigenvalue distribution; and Third: a configuration that combines a codebook index of a compressed channel vector, that is, a direction index and a magnitude index.

Figure 3:
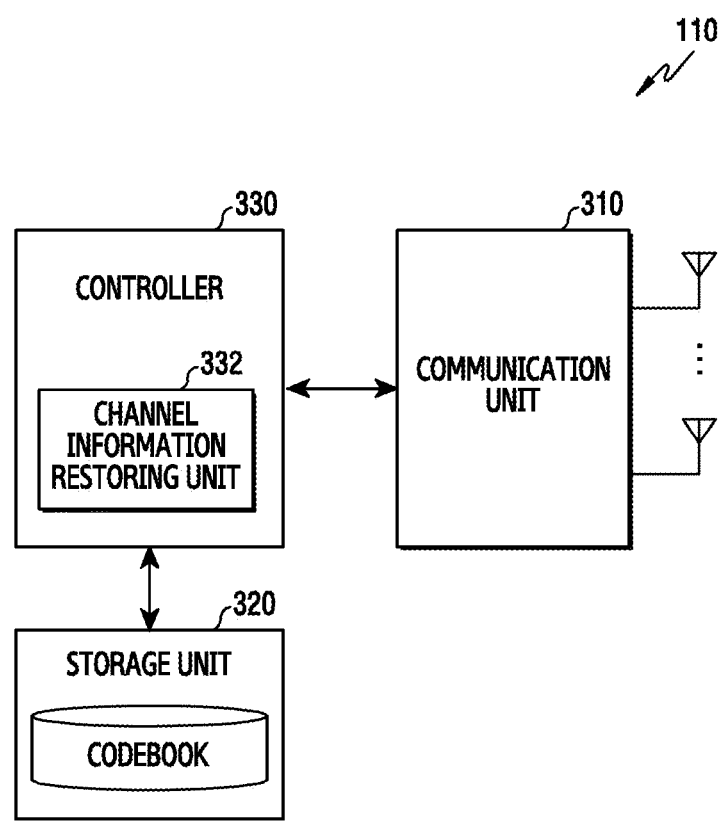
FIG. 3 illustrates a transmitting node in a wireless communication system according to various embodiments of the present disclosure.

FIG. 3 is a block diagram of a transmitting node in a wireless communication system according to the present disclosure. Referring to FIG. 3, the transmitting node 110 may include a communication unit 310, a storage unit 320, and a controller 330. Hereinafter, the terms such as '-unit', ending such as '-er', '-or', and the like indicate a unit that processes at least one function or operation, which may be embodied by hardware, software, or a combination thereof.

The communication unit 310 performs functions for transmitting and receiving signals through a wireless channel. For example, the communication unit 310 performs a function of conversion between a baseband signal and a bit stream, based on a physical layer standard of a system. For example, when data is transmitted, the communication unit 310 encodes and modulates a transmission bit stream, so as to generate complex symbols. Also, when data is received, the communication unit 310 decodes and demodulates a baseband signal, so as to restore a reception bit stream. Also, the communication unit 310 up-converts a baseband signal into a radio frequency (RF) band signal and transmits the same through an antenna, and down-converts an RF band signal received through the antenna into a baseband signal. For example, the communication unit 310 may include a transmission filter, a reception filter, an amplifier, a mixer, an oscillator, a digital to analog convertor (DAC), an analog to digital convertor (ADC), or the like.

Also, the communication unit 310 may include a plurality of RF chains. In addition, the communication unit 310 may perform beamforming. To perform beamforming, the communication unit 310 may adjust a phase and a size of each signal that is transmitted or received through a plurality of antennas or antenna elements.

The communication unit 310 may transmit and receive a signal as described above. Accordingly, the communication unit 310 may also be referred to as a transmitting unit, a receiving unit, or a transceiving unit.

The storage unit 320 may store data, such as, a basic program, an application program, configuration information, or the like, used for operating the transmitting node 110. Particularly, the storage unit 320 may store a direction codebook used for quantizing direction information of compressed channel information, and a magnitude codebook used for quantizing magnitude information of the compressed channel information. In addition, the storage unit 320 may provide data stored therein in response to a request from the controller 330.

The controller 330 may control general operations of the transmitting node 110. For example, the controller 330 may transmit and receive signals through the communication unit 310. In addition, the controller 330 may record and read data in the storage unit 320. To this end, the controller 330 may include at least one processor. According to the present disclosure, the controller 330 may include a channel information restoring unit 332 that restores compressed channel information that is received from the receiving unit 120. For example, the controller 330 may control the transmitting node 110 so as to perform the procedure illustrated in FIGS. 9, 11, 12, and the like.

Figure 4:
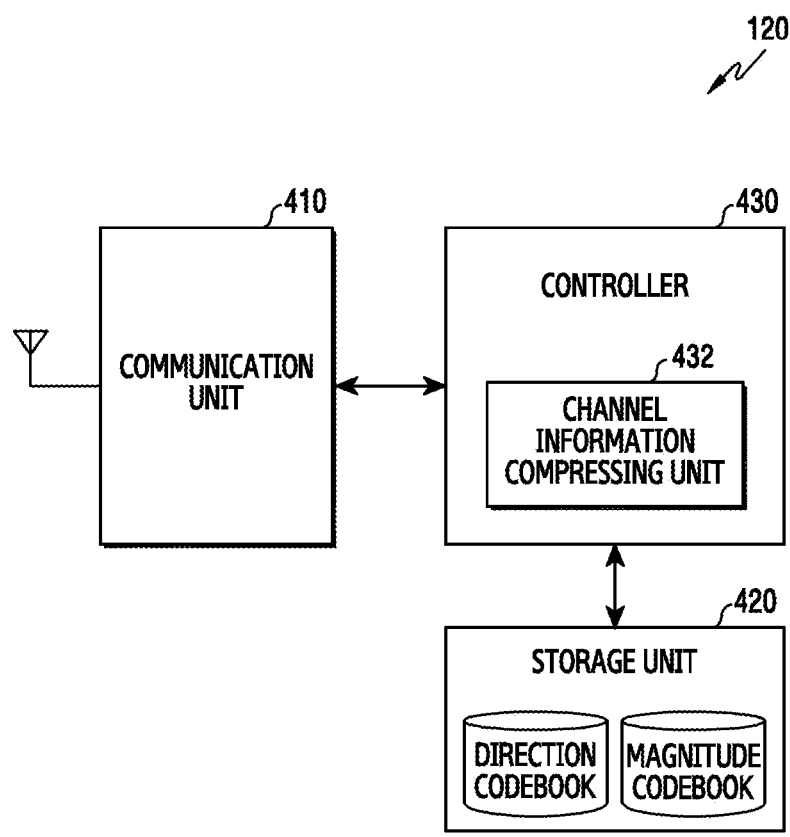
FIG. 4 illustrates a receiving node in a wireless communication system according to various embodiments of the present disclosure.

FIG. 4 is a block diagram of a receiving node in a wireless communication system according to the present disclosure. Referring to FIG. 4, the receiving node 120 may include a communication unit 410, a storage unit 420, and a controller 430. Hereinafter, the terms such as '-unit', ending such as '-er', '-or', and the like indicate a unit that processes at least one function or operation, which may be embodied by hardware, software, or a combination thereof.

The communication unit 410 performs functions for transmitting and receiving signals through a wireless channel. For example, the communication unit 410 performs a function of conversion between a baseband signal and a bit stream, based on a physical layer standard of a system. For example, when data is transmitted, the communication unit 410 encodes and modulates a transmission bit stream, so as to generate complex symbols. Also, when data is received, the communication unit 410 decodes and demodulates a baseband signal, so as to restore a reception bit stream. Also, the communication unit 410 up-converts a baseband signal into a radio frequency (RF) band signal and transmits the same through an antenna, and down-converts an RF band signal received through the antenna into a baseband signal. For example, the communication unit 410 may include a transmission filter, a reception filter, an amplifier, a mixer, an oscillator, a DAC, an ADC, and the like. The communication unit 410 may transmit and receive a signal as described above. Accordingly, the communication unit 410 may also be referred to as a transmitting unit, a receiving unit, or a transceiving unit. In FIG. 4, it is illustrated that the receiving node 120 is equipped with a single antenna. However, according to another embodiment of the present disclosure, the receiving node 120 may include a plurality of antennas.

The storage unit 420 may store data, such as, a basic program, an application program, configuration information, or the like, used for operating the receiving node 120. Particularly, the storage unit 420 may store a direction codebook used for quantizing direction information of compressed channel information and a magnitude codebook used for quantizing magnitude information of the compressed channel information. In addition, the storage unit 420 provides data stored therein in response to a request from the controller 430.

The controller 430 may control general operations of the receiving node 120. For example, the controller 430 may transmit and receive signals through the communication unit 410. In addition, the controller 430 may record and read data in the storage unit 420. To this end, the controller 430 may include at least one processor. For example, the controller 430 may include a communication processor (CP) that performs a control for communication, and an application processor (AP) that controls an upper layer such as an application program or the like. According to the present disclosure, the controller 430 may include a channel information compressing unit 432 that compresses channel information to be fed back to the transmitting node 120. For example, the controller 430 may control the receiving node 120 to perform the procedure illustrated in FIGS. 8, 10, and 12.

Figure 5:
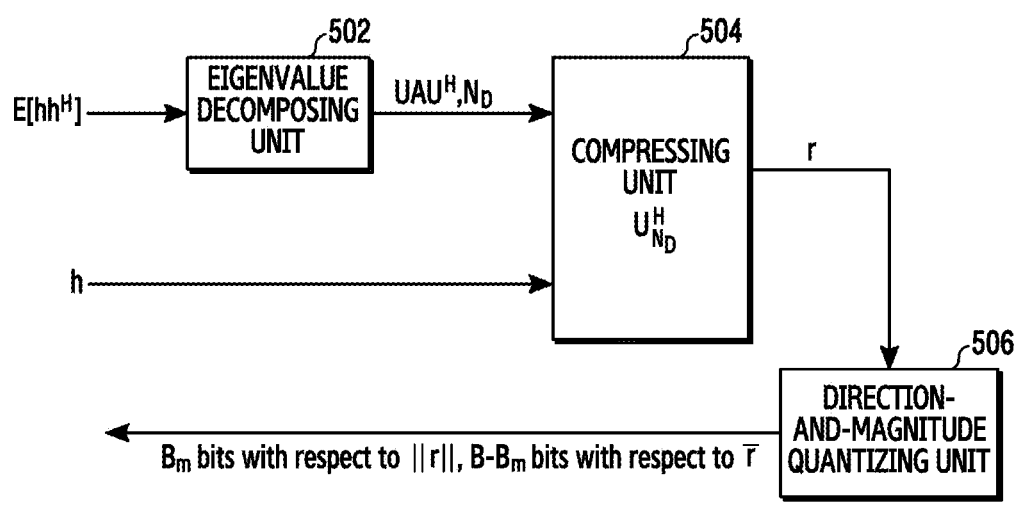
FIG. 5 illustrates compressing channel information in a receiving node in a wireless communication system according to various embodiments of the present disclosure.

FIG. 5 is a block diagram for compressing channel information in a receiving node in a wireless communication system according to the present disclosure. FIG. 5 illustrates a functional configuration of components for channel information compression in the receiving node 120. Hereinafter, an index k of the receiving node 120 will be omitted, without losing generality.

Referring to FIG. 5, the receiving node 120 includes an eigenvalue decomposing unit 502, a compressing unit 504, and a direction-and-magnitude quantizing unit 506. The eigenvalue decomposing unit 502 performs eigenvalue decomposition with respect to long-term channel covariance information. The eigenvalue decomposition may be performed as shown in Equation 11.

$$R = E[hh^H] = U \Lambda U^H \quad \text{[Equation 11]}$$

In Equation 11, $R \in \mathbb{C}^{N_t \times tN_t}$ denotes a long-term covariance matrix, h denotes a channel vector, U denotes a unitary matrix, and $\Lambda$ denotes a diagonal matrix. The covariance matrix may be referred to as a correlation matrix.

The covariance matrix may be determined from an average of covariance information of a plurality of fading blocks. That is, the receiving node 120 estimates channel vectors respectively from a plurality of resource blocks (e.g., slots, subframes, or fading blocks), and calculate an average of a product of each channel vector and Hermitian of a corresponding channel vector with respect to the plurality of resource blocks, so as to determine the covariance matrix. In this instance, in the eigenvalue diagonal matrix $\Lambda$, eigenvalues are arranged in descending order, and eigenvectors corresponding thereto may also be arranged in U.

After the eigenvalue decomposition, the compressing unit 504 may determine the number of effective dimensions for compressed channel information. According to an embodiment of the present disclosure, the number of effective dimensions may be defined as ND(<Nt) in advance. Alternatively, according to another embodiment of the present disclosure, the number of effective dimensions may be determined based on an eigenvalue distribution. When it is based on the eigenvalue distribution, the number of effective dimensions may be determined by Equation 12 as provided blow.

$$\sum_{i=1}^{N_D} p_i \geq \beta \sum_{i=1}^{N_t} p_i \quad \text{[Equation 12]}$$

In Equation 12, $N_D$ denotes the number of effective dimensions, $p_i$ denotes power of an $i^{th}$ eigenvalue among eigenvalues arranged in descending order, $\beta(\leq 1)$ denotes a rate constant that determines a threshold value, and $N_t$ denotes the number of antennas.

In Equation 12, when $\beta=0.95$, the compressing unit 504 may determine a minimum number of effective eigenvalues, that is, the number ND of effective dimensions, wherein the sum of power of selected eigenvalues is greater than or equal to 95% of the entire power. When the number of effective dimensions is determined, the compressing unit 504 may generate a compressed channel vector. Channel compression may be performed by multiplexing an original channel vector with Hermitian of vectors of the U matrix up to an NDth vector. In other words, the compressed channel information may be determined by calculating the product of the channel information and Hermitian of columns of the unitary matrix. For example, the compressed channel information may be determined by Equation 13, as provided below.

$$r = U_{N_D}^H h \quad \text{[Equation 13]}$$

In Equation 13, $r \in C^{N_D \times 1}$ denotes a compressed channel vector, $N_{N_D} \in C^{N_t \times N_D}$ denotes a matrix including the first column to the $N_D^{th}$ columns of the U matrix, and h denotes a channel vector.

The compressed vector r, that is, the dimension of the compressed channel information may be equal to the number of effective dimensions. That is, the dimension of the compressed channel information may be smaller than channel information before compression, that is, the dimension $N_T$ of a channel vector before compression.

According to the eigenvalue decomposition-based feedback compression scheme according to various embodiments of the present disclosure, the receiving node 120 transmits, to the transmitting node 110, quantization information associated with a magnitude $\|r\|$ and a direction $\bar{r}$ of the compressed vector r. When the number of feedback bits for quantization of a channel vector before compression is B, the compressed vector in the eigenvalue decomposition-based feedback compression scheme may be separated into the number $B_m$ of bits for quantizing magnitude information and the number $B-B_m$ of bits for quantizing direction information.

To quantize the direction information of the compressed vector, the direction-and-magnitude quantizing unit 506 may determine a codebook index. Based on the codebook $\tilde{C}=\{c_1, \ldots, c_{2^{B-B_m}}\}$ having B-Bm feedback bits, a codebook index that minimizes a quantization error in association with $\bar{r}$, may be selected. The codebook index may be selected as shown in Equation 14.

$$c^* = \arg\max_{\tilde{c}=c_1, c_{2^{B-B_m}}} |\bar{r}^H \tilde{c}| \quad \text{[Equation 14]}$$

In Equation 14, c* denotes a codebook index, $$\bar{r} = \frac{r}{\|r\|}$$

denotes direction information of a compressed channel vector, and $\tilde{c}$ denotes a codeword in a codebook.

In the eigenvalue decomposition-based channel compression scheme and non-compression feedback scheme, an amount of feedback for each channel direction information entry may be expressed as $$\frac{B-B_m}{N_D} \text{ and } \frac{B}{N_t},$$

respectively. In the high-capacity MIMO antenna communication system, a compressed channel vector dimension $N_D$ is relatively smaller than $N_t$. Therefore, an amount of feedback for each channel direction information entry of the eigenvalue decomposition-based channel compression scheme increases and thus, the accuracy of quantization of the compressed channel vector may increase.

To quantize the magnitude information of the compressed vector, the direction-and-magnitude quantizing unit 506 may determine a magnitude index. For example, based on the codebook $M=\{m_1, \ldots, m_{2^{B_m}}\}$ having $B_m$ feedback bits, a magnitude index that is the closest to a decreasing ratio that decreases the original channel vector size $\|h\|$ to $\|r\|$, may be selected. For example, the magnitude index may be selected as shown in Equation 15.

$$m^* = \arg\min_{m=m_1, \ldots, m_{2^{B_m}}} \left| \frac{\|r\|}{\|h\|} - m \right| \quad \text{[Equation 15]}$$

In Equation 15, m* denotes a magnitude index, m denotes a codeword in a magnitude codebook, $\|r\|$ denotes a magnitude of compressed channel information, and $\|h\|$ denotes a magnitude of channel information before compression.

Here, the codebook M includes decreasing radio candidates $m_1, \ldots, m_{2^{B_m}} < 1$. Each radio candidate $m_1, \ldots, m_{2^{B_m}}$ may exist in a range of [0,1] as shown in Equation 16.

$$\|r\| = \|U_{N_D}^H h\| = \left\| \begin{bmatrix} u_1^H \\ u_2^H \\ \vdots \\ u_{N_D}^H \end{bmatrix} h \right\| = \quad \text{[Equation 16]}$$

$$\left\| \begin{bmatrix} u_1^H h \\ u_2^H h \\ \vdots \\ u_{N_D}^H h \end{bmatrix} \right\| = \sqrt{(u_1^H h)^2 + (u_2^H h)^2 + \ldots + (u_{N_D}^H h)^2} \leq$$

$$\sqrt{(u_1^H h)^2 + (u_2^H h)^2 + \ldots + (u_{N_T}^H h)^2} =$$

$$\|U^H h\| = h^T U^T U h = h^T h = \|h\| \Rightarrow \frac{\|r\|}{\|h\|} \leq 1.$$

In Equation 16, $\|r\|$ denotes a magnitude of compressed channel information, $N_{N_D} \in \mathbb{C}^{N_t \times N_D}$ denotes a matrix including a first column to an $N_D{}^{th}$ column of the U matrix, h denotes a channel vector, $\|h\|$ denotes a magnitude of channel information before compression, and $u_k$ denotes a $k^{th}$ column of $N_{N_D} \in \mathbb{C}^{N_t \times N_D}$.

Subsequently, the receiving node 120 may transmit, to the transmitting node 110, selected direction information c* and magnitude information m*, as described above.

Figure 6:
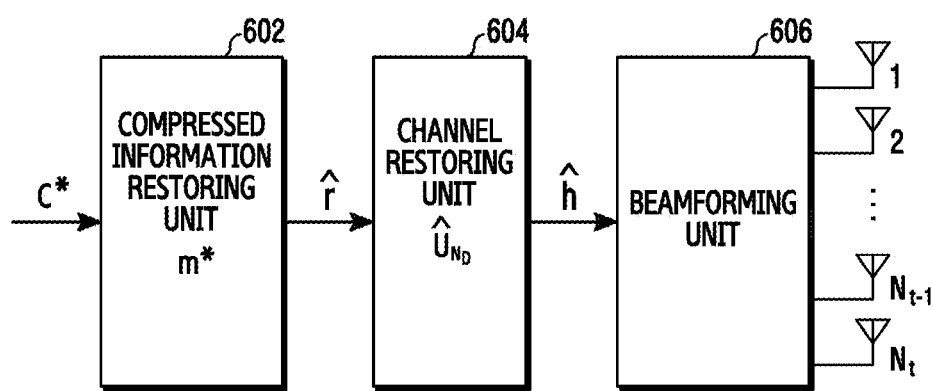
FIG. 6 illustrates restoring channel information in a transmitting node in a wireless communication system according to various embodiments of the present disclosure.

FIG. 6 is a block diagram for restoring channel information in a transmitting node in a wireless communication system according to the present disclosure. FIG. 6 illustrates a functional configuration of components for channel information restoration and beamforming in the transmitting node 110.

Referring to FIG. 6, the transmitting node 110 includes a compressed information restoring unit 602, a channel restoring unit 604, and a beamforming unit 606. The compressed information restoring unit 602 may restore compressed-channel information based on received direction information and magnitude information. For example, the compressed channel information may be restored by Equation 17, as provided below.

$$r = m^* c^*. \qquad \text{[Equation 17]}$$

In Equation 17, $\hat{r}$ denotes compressed-channel information, c* denotes quantized direction information, and m* quantized magnitude information.

The dimension of restored compressed-channel information is $N_D$. To make the dimension equal to the dimension of the channel vector before compression, a channel restoration process is required. The channel restoring unit 604 performs eigenvalue decomposition with respect to channel covariance information R that is fed back in long-term from the receiving node 120, obtains $\hat{U}_{N_D}$, and restores the channel information using obtains $\hat{U}_{N_D}$. Here, according to another embodiment of the present disclosure, the channel covariance information may be directly calculated by the transmitting node 110. For example, the channel information may be restored by Equation 18, as provided below.

$$\hat{h} = \hat{U}_{N_D} \hat{r} \qquad \text{[Equation 18]}$$

In Equation 18, $\hat{h}$ denotes restored channel information, $\hat{U}_{N_D}$ denotes a unitary matrix formed of $N_D$ columns, and $\hat{r}$ denotes compressed channel information.

Subsequently, the beamforming unit 606 determines a beamforming matrix based on the restored channel information. The beamforming unit 606 performs beamforming with respect to a data signal using the beamforming matrix.

Figure 7:
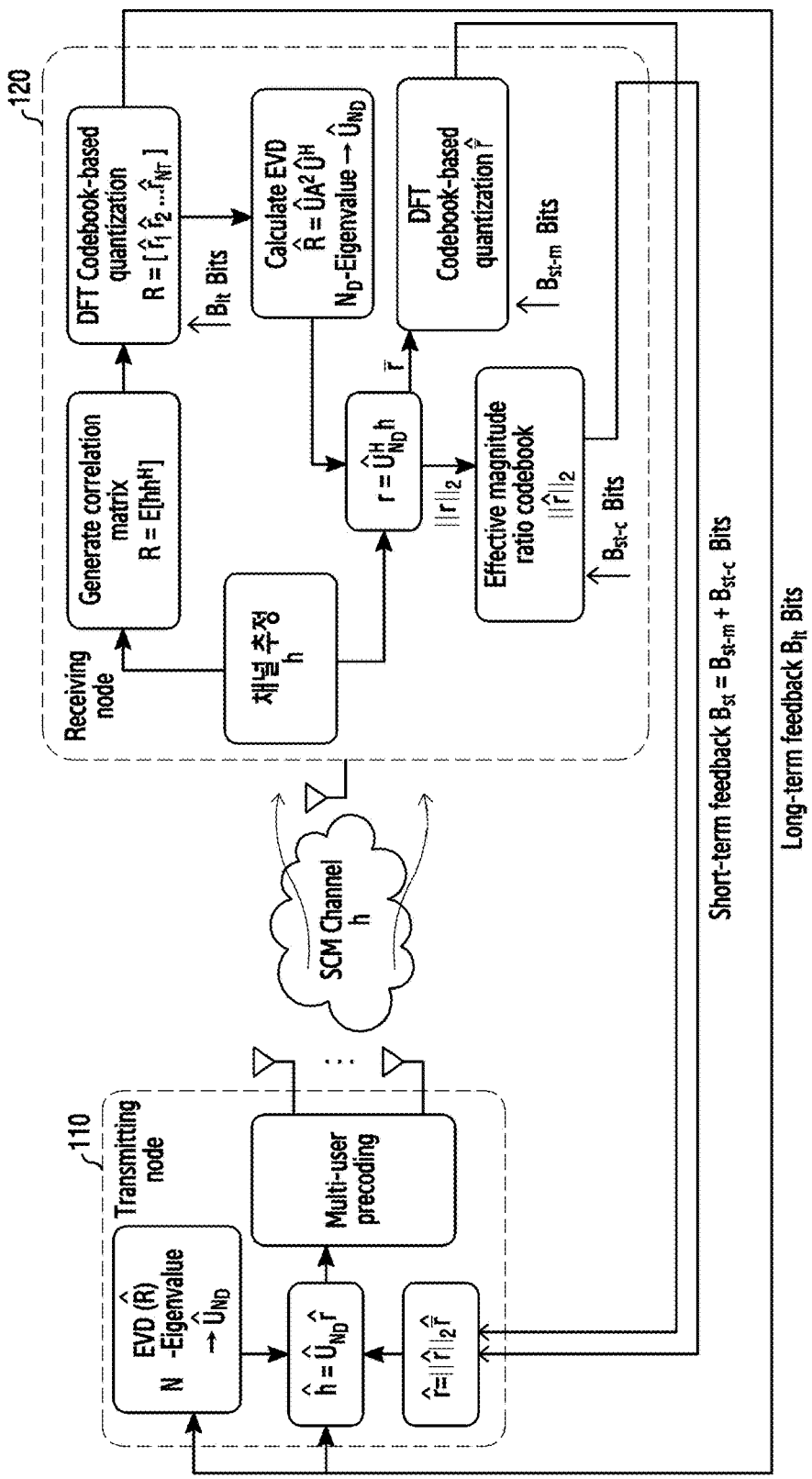
FIG. 7 illustrates channel information feedback and restoration in a wireless communication system according to various embodiments of the present disclosure.

FIG. 7 is a diagram functionally illustrating channel information feedback and restoration in a wireless communication system according to the present disclosure. FIG. 7 illustrates procedures such as channel information compression, channel information restoration, beamforming, and the like. That is, FIG. 7 illustrates a series of procedures performed by the receiving node 120 and the transmitting node 110. Here, the receiving node 120 may include a user equipment and the transmitting node 110 may include a base station.

Referring to FIG. 7, channel estimation is initially performed by the receiving node 120, and a correlation matrix is generated in long-term. Subsequently, discrete fourier transform (DFT) codebook-based quantization is performed, and eigen value decomposition (EVD) is calculated. In this instance, a quantized covariance matrix is information in a size of Blt, and is fed back in long-term. Subsequently, the initially estimated channel is compressed based on the result of EVD, and DFT codebook-based direction quantization and effective magnitude ratio codebook-based magnitude quantization are performed based on the compressed channel information Subsequently, feedback may be performed, including the quantized direction information and the quantized magnitude information.

Next, in the transmitting node 110, the compressed channel information may be restored based on the quantized direction information and the quantized magnitude information. EVD may be performed with respect to the quantized covariance matrix that is fed back in long-term, and channel information may be restored based on the result of the EVD and the compressed channel information. Subsequently, multi-user precoding may be performed by a beamforming matrix that is determined based on the channel information.

As described above, based on the compression-based feedback scheme, a scenario from the perspective of the management of a feedback between a transmitting node and a receiving node, may be provided as follows. The transmitting node may include a base station, and the receiving node may include a user equipment. The user equipment may determine Bm and B-Bm. Each user equipment may select a magnitude information index and a direction information index of a compressed channel vector, through feedback resource allocation. To this end, maximum Bm should be determined in advance, and a corresponding magnitude codebook needs to be defined, that is, shared, in advance between the base station and user equipment.

Figure 8:
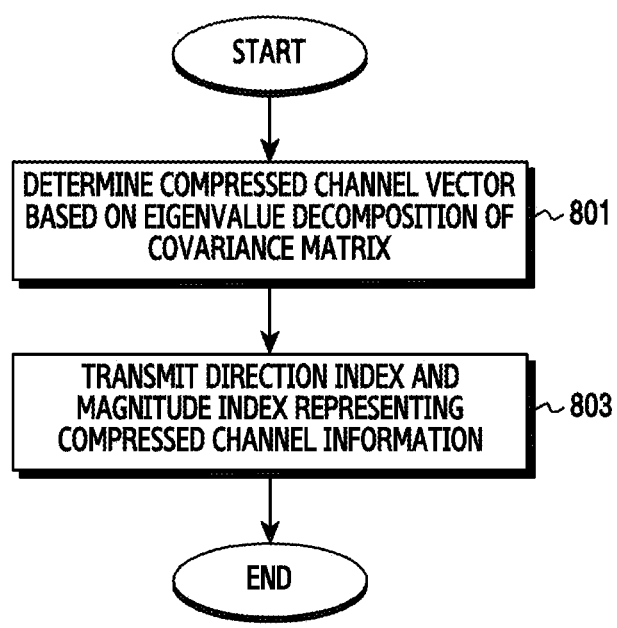
FIG. 8 illustrates an operation procedure of a receiving node in a wireless communication system according to various embodiments of the present disclosure.

FIG. 8 is a flowchart illustrating an operation procedure of a receiving node in a wireless communication system according to the present disclosure. FIG. 8 illustrates an operation method of the receiving node 120.

Referring to FIG. 8, the receiving node 120 determines compressed channel information based on eigenvalue decomposition of a covariance matrix regarding a channel in operation 801. To this end, the receiving node 120 may determine the covariance matrix based on a signal received through at least one resource block (e.g., slots, subframes, or fading blocks). The receiving node 120 measures channel information (e.g., a channel vector, a channel matrix, or the like), performs eigenvalue decomposition with respect to the covariance matrix, and determines compressed channel information using columns of a unitary matrix corresponding to eigenvalues of which the number is smaller than a dimension of channel information before compression, among a plurality of eigenvalues. Here, the eigenvalues of which the number is smaller than the dimension, may include eigenvalues of which the number is smaller than the dimension that has a relatively larger value. For example, the receiving node 120 performs eigenvalue decomposition as shown in Equation 11, selects ND eigenvalues as shown in Equation 12, and determines compressed channel information as shown in Equation 13.

Subsequently, the receiving node 120 proceeds with operation 803, and transmits a direction index and a magnitude index representing the compressed channel information. That is, the receiving node 120 separates the compressed channel information into direction information and magnitude information, and separately quantizes the direction information and the magnitude information. Particularly, the receiving node 120 quantizes the direction information using a first codebook and quantizes the magnitude information using a second codebook, so as to determine a direction index and a magnitude index. In other words, the receiving node 120 selects the direction index using the first codebook used for quantizing direction information, and selects the magnitude index using the second codebook used for quantizing magnitude information. For example, the receiving node 120 may determine the direction index as shown in Equation 14, and may determine the magnitude index as shown in Equation 15. The receiving node 120 may transmit the direction index and the magnitude index through a feedback channel.

Although not illustrated in FIG. 8, in parallel with the procedure illustrated in FIG. 8, the receiving node 120 transmits information associated with the covariance matrix to a transmitting node. In this instance, the receiving node 120 may transmit the information associated with the covariance matrix in a relatively long term when compared to the compressed channel information. In addition, the covariance matrix may be quantized based on a codebook and transmitted.

Figure 9:
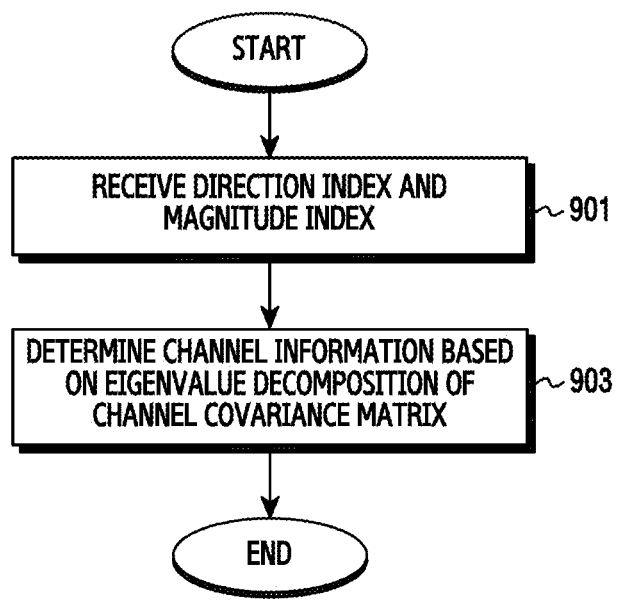
FIG. 9 illustrates an operation procedure of a transmitting node in a wireless communication system according to various embodiments of the present disclosure.

FIG. 9 is a flowchart illustrating an operation procedure of a transmitting node in a wireless communication system according to the present disclosure. FIG. 9 illustrates an operation method of the transmitting node 110.

Referring to FIG. 9, the transmitting node 110 receives a direction index and a magnitude index in operation 901. The direction index and the magnitude index indicate direction information and magnitude information of compressed channel information. The direction index is determined based on a first codebook used for quantizing a direction in a receiving node, and the magnitude index is determined based on a second codebook used for quantizing a magnitude in the receiving node.

Subsequently, the transmitting node 110 proceeds with operation 903, and determines channel information through eigenvalue decomposition of a channel covariance matrix. Particularly, the transmitting node 110 restores compressed channel information based on the direction index and the magnitude index. For example, the transmitting node 110 restores the compressed channel information by multiplexing the direction index and the magnitude index. Particularly, the transmitting node 110 identifies direction information corresponding to the direction index by using the first codebook used for quantizing direction information, identifies magnitude information corresponding to the magnitude index by using the second codebook used for quantizing magnitude information, and determines compressed channel information based on the direction information and the magnitude information. For example, the transmitting node may restore the compressed channel information as shown in Equation 17. The transmitting node 110 may perform eigenvalue decompression of a covariance matrix regarding a channel associated with the receiving node, and may restore the channel information using columns of a unitary matrix corresponding to eigenvalues of which the number is smaller than a dimension of channel information before compression, among eigenvalues obtained through eigenvalue decomposition. Here, the eigenvalues of which the number is smaller than the dimension may include eigenvalues of which the number is smaller than the dimension that has a relatively larger value. Here, the covariance matrix may be calculated directly by the transmitting node 110, or may be fed back from the receiving node. For example, the transmitting node 110 restores the channel information by multiplexing the compressed channel information and the columns of the unitary matrices. For example, the transmitting node 110 may restore the channel information as shown in Equation 18.

Figure 10:
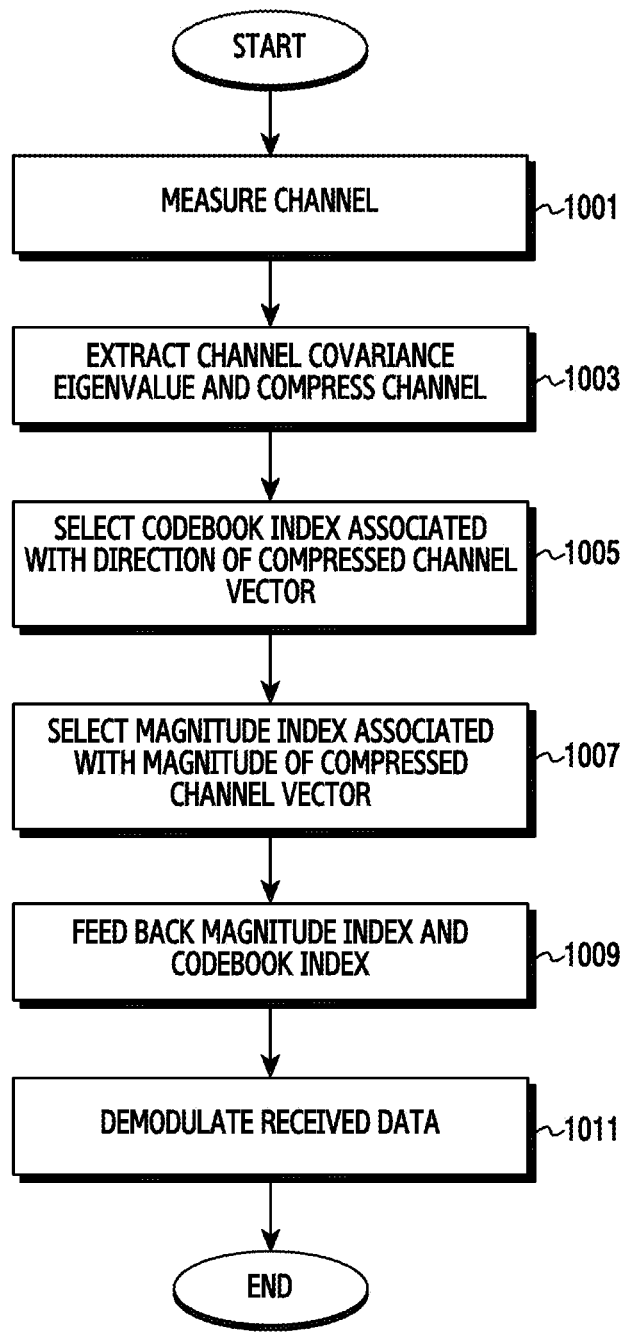
FIG. 10 illustrates another operation procedure of a receiving node in a wireless communication system according to various embodiments of the present disclosure.

FIG. 10 is a flowchart illustrating another operation procedure of a receiving node in a wireless communication system according to the present disclosure. FIG. 10 illustrates an operation method of the receiving node 120.

Referring to FIG. 10, the receiving node 120 estimates a channel in operation 1001. The channel may be measured by receiving a signal that is known to the receiving node 120 and a transmitting node. For example, the signal may be referred to as a reference signal, a pilot signal, a synchronization signal, a preamble, a training signal, a beacon signal, and the like.

Subsequently, the receiving node 120 extracts an eigenvalue of a channel covariance, and compresses a channel in operation 1003. That is, the receiving node 120 calculates a covariance matrix from long-term channel measurement values, and performs eigenvalue decomposition with respect to the covariance matrix. The receiving node 120 selects ND eigenvalues based on a predefined standard, and compresses channel information using columns of a unitary matrix corresponding to the selected ND eigenvalues.

Subsequently, the receiving node 120 proceeds with operation 1005, and selects a codebook index associated with a direction of a compressed channel vector. That is, the receiving node stores a first codebook used for a direction of a compressed channel vector, and selects, from the first codebook, at least one codeword corresponding to the direction of the compressed channel vector. For example, the receiving node 120 may select the codebook index as shown in Equation 14.

Subsequently, the receiving node 120 proceeds with operation 1007, and selects a magnitude index associated with a magnitude of the compressed channel vector. That is, the receiving node 120 stores a second codebook used for a magnitude of the compressed channel vector, and selects, from the second codebook, at least one codeword corresponding to the magnitude of the compressed channel vector. For example, the receiving node 120 may select a magnitude index as shown in Equation 15.

Next, the receiving node 120 proceeds with operation 1009, and feeds back the magnitude index and the codebook index. In other words, the receiving node 120 transmits compressed channel information including the magnitude index and the codebook index. Although not illustrated in FIG. 10, the receiving node 120 may further feedback the channel covariance matrix. In this instance, the channel covariance matrix may be fed back in a relatively long term when compared to the magnitude index and the codebook index.

Subsequently, the receiving node 120 proceeds with operation 1011, and demodulates received data. Here, the received data may be transmitted, after beamforming or precoding is performed by the transmitting node 110. Here, the beamforming vector or matrix for beamforming or precoding may be selected based on the magnitude index and the direction index.

Figure 11:
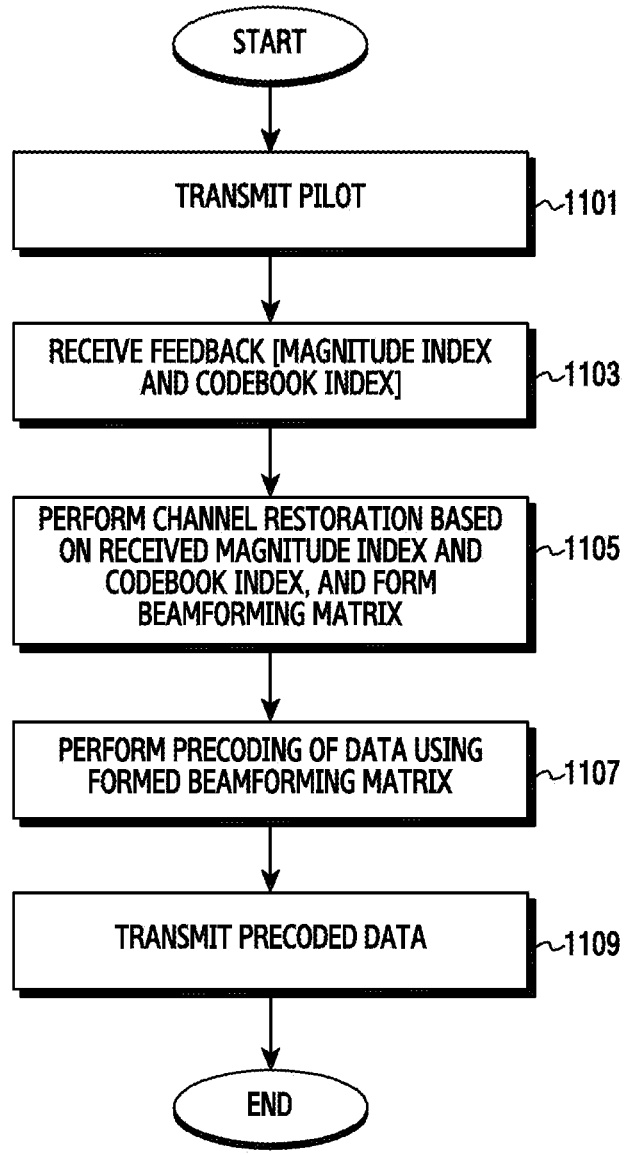
FIG. 11 illustrates another operation procedure of a transmitting node in a wireless communication system according to various embodiments of the present disclosure.

FIG. 11 is a flowchart illustrating another operation procedure of a transmitting node in a wireless communication system according to the present disclosure. FIG. 11 illustrates an operation method of the transmitting node 110.

Referring to FIG. 11, the transmitting node 110 transmits a pilot in operation 1101. The pilot is a signal for measuring a channel of a receiving node, and may be a signal having a value that is known to a receiving node and the transmitting node 110. The pilot may be replaced with a reference signal, a synchronization signal, a preamble, a training signal, a beacon signal, and the like.

Subsequently, the transmitting node 110 proceeds with operation 1103 and receives feedback information including a magnitude index and a codebook index. In other words, the transmitting node 110 receives compressed channel information including the magnitude index and the codebook index. Although not illustrated in FIG. 11, the transmitting node 110 may further receive the channel covariance matrix. In this instance, the channel covariance matrix may be fed back in a relatively long term when compared to the magnitude index and the codebook index.

Subsequently, the transmitting node 110 proceeds with operation 1105, and performs channel restoration based on the received magnitude index and the codebook index. The transmitting node forms a beamforming matrix. Particularly, the transmitting node 110 restores compressed channel information based on the direction index and the magnitude index. For example, the transmitting node restores the compressed channel information by multiplexing the direction index and the magnitude index. For example, the transmitting node may restore the compressed channel information as shown in Equation 17. The transmitting node may perform eigenvalue decompression of a covariance matrix regarding a channel associated with the receiving node, and may restore the channel information using columns of a unitary matrix corresponding to ND eigenvalues among eigenvalues obtained through eigenvalue decomposition. Here, the covariance matrix may be calculated directly by the transmitting node 110, or may be fed back from the receiving node. For example, the transmitting node may restore the channel information by multiplexing the compressed channel information and the columns of the unitary matrices. For example, the transmitting node 110 may restore the channel information as shown in Equation 18.

Subsequently, the transmitting node 110 proceeds with operation 1107, and performs precoding of data using the beamforming matrix. That is, the transmitting node 110 performs beamforming or precoding with respect to a data signal by using the beamforming matrix. For example, the transmitting node 110 may shift at least one of a phase and a size of data signals for each antenna element, based on the beamforming matrix. That is, the transmitting node 110 may multiplex the data signals and the beamforming matrix. In this instance, the beamforming matrix may be determined for a single user or multiple users.

Subsequently, the transmitting node 110 proceeds with operation 1109, and transmits precoded data. In other words, the transmitting node 110 transmits data signals that are multiplexed with the beamforming matrix, through multiple antennas or antenna elements of an antenna array.

Figure 12:
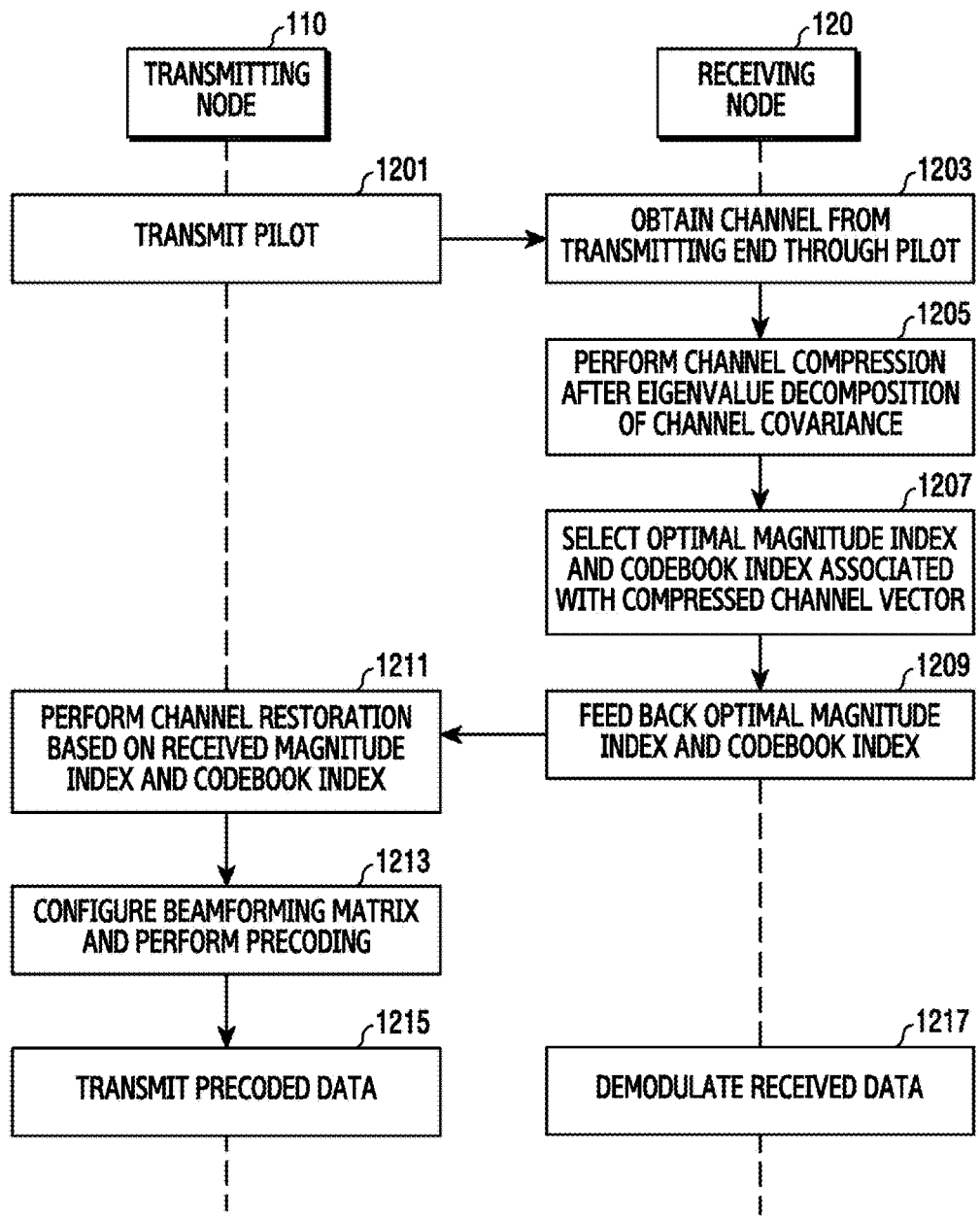
FIG. 12 illustrates channel information feedback and data transmission in a wireless communication system according to various embodiments of the present disclosure.

FIG. 12 is a flowchart illustrating channel information feedback and data transmission in a wireless communication system according to the present disclosure. FIG. 12 illustrates exchanging a signal between the transmitting node 110 and the receiving node 120.

Referring to FIG. 12, the transmitting node 110 transmits a pilot in operation 1201. Accordingly, in operation 1203, the receiving node 120 obtains a channel from the transmitting node 110, through the pilot. Here, the pilot is a signal for measuring a channel of the receiving node 120, and may be a signal having a value that is known to the receiving node 120 and the transmitting node 110. The pilot may be replaced with a reference signal, a synchronization signal, a preamble, a training signal, a beacon signal, and the like.

In operation 1205, the receiving node 120 extracts an eigenvalue of a channel covariance, and compresses a channel. That is, the receiving node 120 calculates a covariance matrix from long-term channel measurement values, and performs eigenvalue decomposition with respect to the covariance matrix. The receiving node 120 selects ND eigenvalues based on a predefined standard, and compresses channel information using columns of a unitary matrix corresponding to the selected ND eigenvalues.

In operation 1207, the receiving node 120 selects a codebook index associated with a direction of the compressed channel vector and a codebook index. That is, the receiving node 120 stores a first codebook used for a direction of a compressed channel vector, and selects, from the first codebook, at least one codeword corresponding to the direction of the compressed channel vector. Also, the receiving node 120 stores a second codebook used for a magnitude of the compressed channel vector, and selects, from the second codebook, at least one codeword corresponding to the magnitude of the compressed channel vector. For example, the receiving node 120 may select the codebook index as shown in Equation 14, and may select the magnitude index as shown in Equation 15.

In operation 1209, the receiving node 120 feeds back the magnitude index and the codebook index. In other words, the receiving node 120 transmits the compressed channel information including the magnitude index and the codebook index. Although not illustrated in FIG. 12, the receiving node 120 may further feedback the channel covariance matrix. In this instance, the channel covariance matrix may be fed back in a relatively long term when compared to the magnitude index and the codebook index.

In operation 1211, the transmitting node 110 performs channel restoration based on the received magnitude index and the codebook index. The transmitting node 110 forms a beamforming matrix. Particularly, the transmitting node 110 restores compressed channel information based on the direction index and the magnitude index. For example, the transmitting node 110 restores the compressed channel information by multiplexing the direction index and the magnitude index. For example, the transmitting node 110 may restore the compressed channel information as shown in Equation 17. The transmitting node 110 may perform eigenvalue decompression of a covariance matrix regarding a channel associated with the receiving node 120, and may restore the channel information using columns of a unitary matrix corresponding to ND eigenvalues among eigenvalues obtained through eigenvalue decomposition. Here, the covariance matrix may be calculated directly by the transmitting node 110, or may be fed back from the receiving node 120. For example, the transmitting node 110 may restore the channel information by multiplexing the compressed channel information and the columns of the unitary matrices. For example, the transmitting node 110 may restore the channel information as shown in Equation 18.

In operation 1213, the transmitting node 110 performs precoding of data using the beamforming matrix. That is, the transmitting node 110 performs beamforming or precoding with respect to a data signal by using the beamforming matrix. For example, the transmitting node 110 may shift at least one of a phase and a size of data signals for each antenna element, based on the beamforming matrix. That is, the transmitting node 110 may multiplex the data signals and the beamforming matrix. In this instance, the beamforming matrix may be determined for a single user or multiple users.

In operation 1213, the transmitting node 110 performs precoding of data using the beamforming matrix. That is, the transmitting node 110 performs beamforming or precoding with respect to a data signal by using the beamforming matrix. For example, the transmitting node 110 may shift at least one of a phase and a size of data signals for each antenna element, based on the beamforming matrix. That is, the transmitting node 110 may multiplex the data signals and the beamforming matrix. In this instance, the beamforming matrix may be determined for a single user or multiple users.

In operation 1217, the receiving node 120 demodulates received data. Here, the received data may be transmitted, after beamforming or precoding is performed by the transmitting node 110. Here, the beamforming vector or matrix for beamforming or precoding may be selected based on the magnitude index and the direction index.

FIGS. 13 to 16 are diagrams illustrating a result of a simulation of a compression-based feedback according to the present disclosure. In FIGS. 13, 14, 15, and 16, a horizontal axis indicates an SNR expressed in a dB scale, and a vertical axis indicates an achievable transmission rate (achievable rate).

Figure 13:
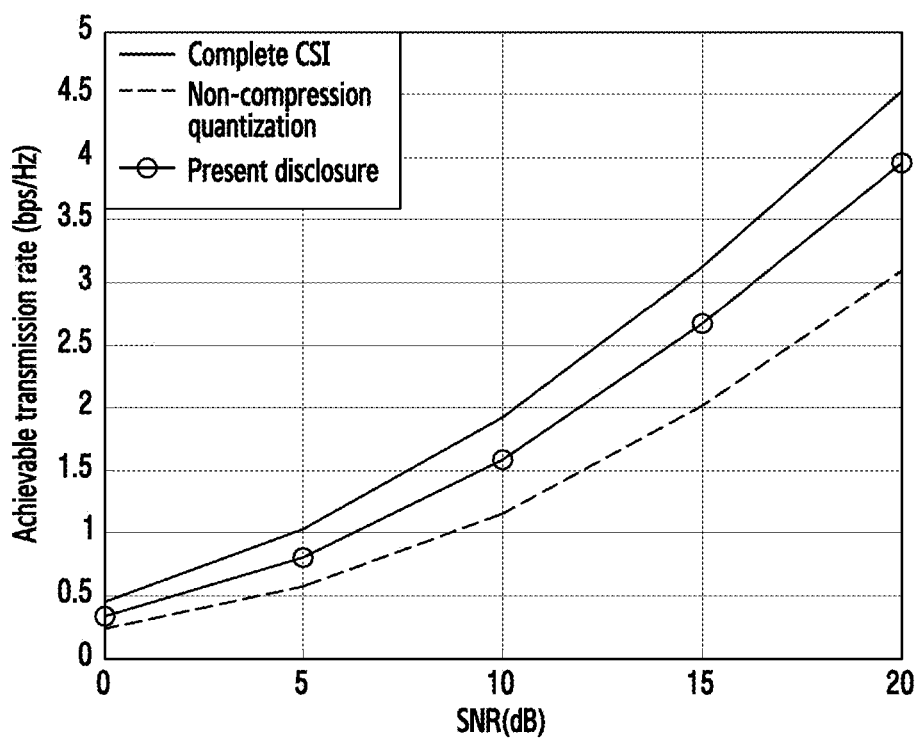
FIGS. 13, 14, 15 and 16 illustrate a result of a simulation of a compression-based feedback according to various embodiments of the present disclosure.
Figure 14:
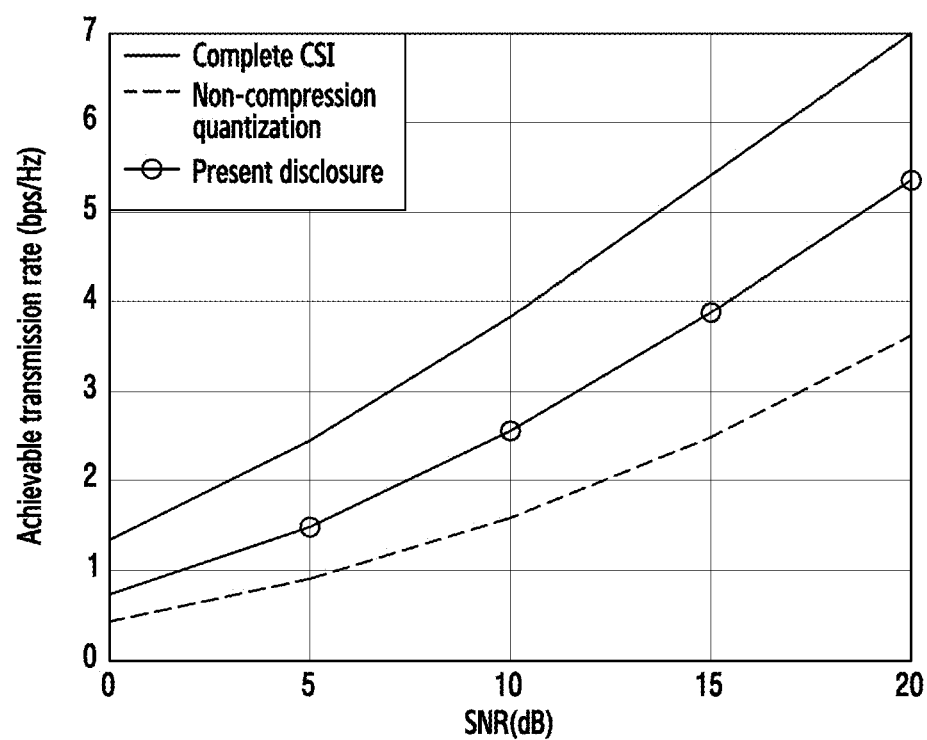

FIGS. 13 and 14 show the effects of the number of quantization bits in association with a decreasing ratio that decreases $\|h\|$ to $\|r\|$. FIGS. 13 and 14 show results of simulation when $N_T=16$ and $N_D=4$, and $N_T=64$ and $N_D=10$. A size of a block is set to 1400, and a movement speed of a UE is set to 3 km/h. The quantization with respect to a covariance matrix may be set to 4 bits or 2 bits with respect to a vertical axis and a horizontal axis. It is determined that the feedback scheme according to the present disclosure provides a higher transmission rate than the non-compression scheme.

Figure 15:
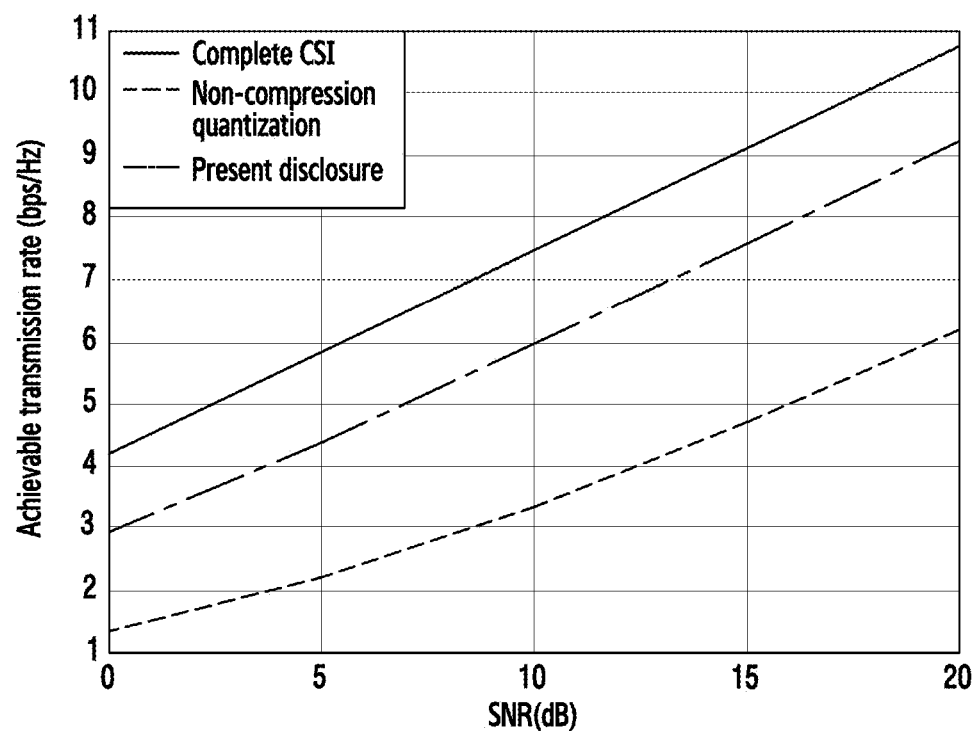
Figure 16:
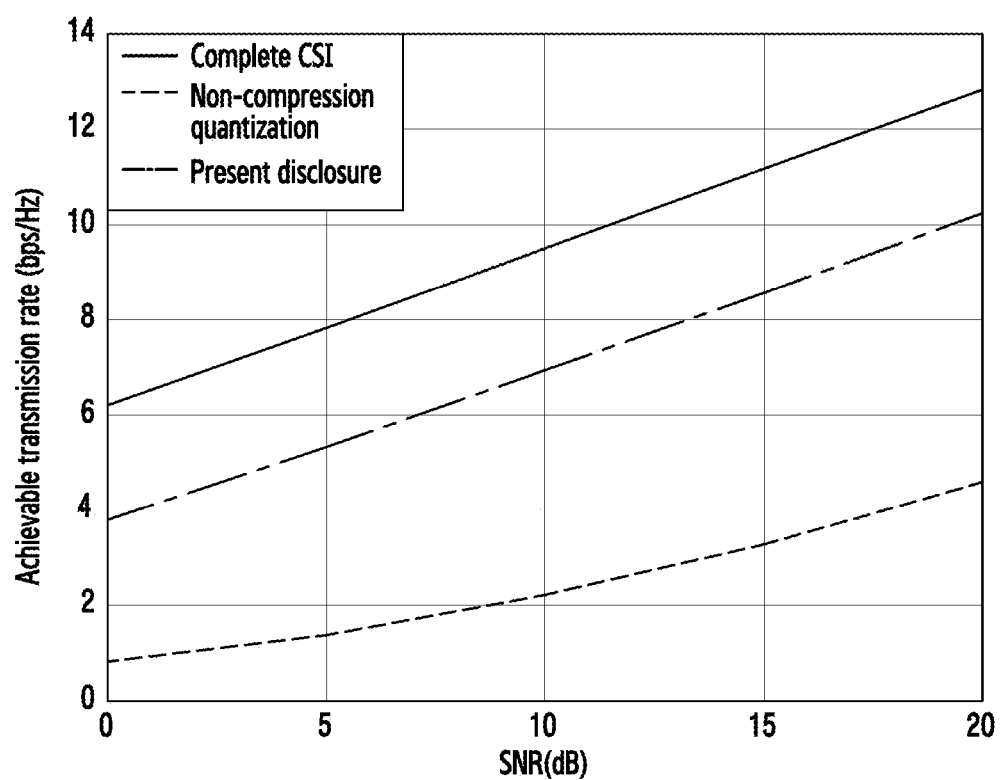

FIGS. 15 and 16 show results of simulation when the number of quantization bits with respect to a decreasing ratio is 2, and the magnitude codebook as provided in Table 1 is used.

TABLE 1

| feedback index | Channel magnitude values |
|---|---|
| 1 | 0.01 |
| 2 | 0.34 |
| 3 | 0.67 |
| 4 | 1 |

FIGS. 15 and 16 show results of simulation when $N_T=16$ and $N_D=4$, and $N_T=64$ and $N_D=16$. A size of a block is set to 1400, and a movement speed of a UE is set to 3 km/h. When $N_T=16$, the total number of feedback bits is set to 8 bits. When $N_T=64$, the total number of feedback bits is set to 16 bits. In comparison to the conventional method, the proposed scheme achieves a higher sum rate under the condition of the same number of feedback bits.

As described above, the amount of feedback for channel vector quantization increases in proportional to the number of transmitting node antennas in a high-capacity MIMO antenna communication system, which is a drawback, and the present disclosure improves the drawback. That is, the present disclosure compresses a channel using a temporal correlation of a high-capacity MIMO system block fading channel, quantizes a compressed channel vector, and selects a magnitude information index and a direction information index, thereby increasing the performance of channel quantization. Accordingly, the present disclosure may show an excellent performance with a smaller number of feedback bits.

Methods stated in claims and/or specifications according to various embodiments may be implemented by hardware, software, or a combination of hardware and software.

In the implementation of software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. The storage devices may be connected to a device, which performs the present disclosure, through an external port. Further, a separate storage device on the communication network may be connected to a device which performs the present disclosure.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a receiving node in a wireless communication system, the method comprising:
- measuring a channel between the receiving node and a transmitting node to generate measured channel information;
- compressing the measured channel information based on an eigenvalue decomposition of a covariance matrix regarding the channel to generate compressed channel information; and
- transmitting, to the transmitting node, a direction index and a magnitude index representing the compressed channel information,
- wherein a dimension of the compressed channel information is lower than a dimension of the measured channel information,
- wherein the magnitude index depends on a ratio between sizes of the measured channel information and the compressed channel information, and
- wherein the magnitude index is used, by the transmitting node, for restoring the measured channel information from the compressed channel information.

2. The method of claim 1, wherein compressing the measured channel information comprises:
- performing the eigenvalue decomposition with respect to the covariance matrix; and
- generating the compressed channel information by using columns of a unitary matrix that corresponds to a set of eigenvalues among a plurality of eigenvalues generated through the eigenvalue decomposition,
- wherein a number of the set of eigenvalues is smaller than the dimension of the compressed channel information.

3. The method of claim 1, further comprising:
- determining the direction index using a first codebook used for quantizing direction information; and
- determining the magnitude index using a second codebook used for quantizing magnitude information.

4. The method of claim 2, wherein the set of eigenvalues includes one or more eigenvalues that are relatively larger than a rest of eigenvalues.

5. The method of claim 2, wherein generating the compressed channel information using the columns of the unitary matrix, comprises:
- determining a product of the measured channel information and Hermitian of the columns of the unitary matrix.

6. An apparatus for a receiving node in a wireless communication system, the apparatus comprising:
- at least one processor configured to measure a channel between the receiving node and a transmitting node to generate measured channel information, and compress the measured channel information based on eigenvalue decomposition of a covariance matrix regarding the channel to generate compressed channel information; and
- a transceiver configured to transmit, to the transmitting node, a direction index and a magnitude index representing the compressed channel information,
- wherein a dimension of the compressed channel information is lower than a dimension of the measured channel information,
- wherein the magnitude index depends on a ratio between sizes of the measured channel information and the compressed channel information, and
- wherein the magnitude index is used, by the transmitting node, for restoring the measured channel information from the compressed channel information.

7. The apparatus of claim 6, wherein the at least one processor is further configured to:
- perform the eigenvalue decomposition with respect to the covariance matrix, and
- generate the compressed channel information using columns of a unitary matrix corresponding to a set of eigenvalues among a plurality of eigenvalues generated through the eigenvalue decomposition,
- wherein a number of the set of eigenvalues is smaller than a dimension of the compressed channel information.

8. The apparatus of claim 6, wherein the at least one processor is further configured to:
- determine the direction index using a first codebook used for quantizing direction information, and
- determine the magnitude index using a second codebook used for quantizing magnitude information.

9. The apparatus of claim 7, wherein the set of eigenvalues includes one or more eigenvalues that are relatively larger than a rest of eigenvalues.

10. The apparatus of claim 7, wherein the at least one processor is further configured to determine a product of the measured channel information and Hermitian of the columns of the unitary matrix so as to determine the compressed channel information.

11. An apparatus for a transmitting node in a wireless communication system, the apparatus comprising:
- a transceiver configured to receive a direction index and a magnitude index representing compressed channel information from a receiving node; and
- at least one processor configured to determine measured channel information from the direction index and the magnitude index, based on eigenvalue decomposition of a covariance matrix regarding a channel,
- wherein the magnitude index depends on a ratio between sizes of the measured channel information and the compressed channel information, and
- wherein the magnitude index is used, by the transmitting node, for restoring the measured channel information from the compressed channel information.

12. The apparatus of claim 11, wherein the at least one processor is further configured to:
- identify direction information corresponding to the direction index using a first codebook used for quantizing direction information,
- identify magnitude information corresponding to the magnitude index using a second codebook used for quantizing magnitude information, and
- determine the compressed channel information based on the direction information and the magnitude information.

13. The apparatus of claim 11, wherein the at least one processor is further configured to:
- determine the compressed channel information based on the direction index and the magnitude index,
- perform eigenvalue decomposition with respect to the covariance matrix, and determine the measured channel information based on the compressed channel information and columns of a unitary matrix corresponding to a set of eigenvalues among a plurality of eigenvalues generated through the eigenvalue decomposition, wherein a number of the set of eigenvalues is smaller than a dimension of the compressed channel information.

14. The apparatus of claim 13, wherein the at least one processor is further configured to determine a product of the compressed channel information and the columns of the unitary matrix, so as to determine the measured channel information.

15. The apparatus of claim 13, wherein the set of eigenvalues includes one or more eigenvalues that are relatively larger than a rest of eigenvalues.

* * * * *